(12) United States Patent
Skaggs et al.

(10) Patent No.: US 10,272,652 B2
(45) Date of Patent: Apr. 30, 2019

(54) HEAT SHRINK LAMINATED COMPOSITE PATCH FOR REPAIRING COMPOSITE COMPONENTS

(71) Applicant: DISNEY ENTERPRISES, INC., Burbank, CA (US)

(72) Inventors: Laurel Lindsey Skaggs, Orlando, FL (US); Mark E. Tripp, Clermont, FL (US); Mark Alan Naylor, Minneola, FL (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 637 days.

(21) Appl. No.: 14/824,735

(22) Filed: Aug. 12, 2015

(65) Prior Publication Data

US 2017/0043564 A1 Feb. 16, 2017

(51) Int. Cl.
*B32B 5/02* (2006.01)
*B32B 7/12* (2006.01)
*B29C 61/02* (2006.01)
*B29C 73/10* (2006.01)
*B32B 27/06* (2006.01)
(Continued)

(52) U.S. Cl.
CPC .............. *B32B 27/12* (2013.01); *B29C 61/02* (2013.01); *B29C 73/10* (2013.01); *B32B 5/02* (2013.01); *B32B 7/12* (2013.01); *B32B 27/06* (2013.01); *B32B 27/08* (2013.01); *B32B 27/32* (2013.01); *B32B 27/38* (2013.01); *B32B 2260/021* (2013.01); *B32B 2260/023* (2013.01); *B32B 2260/046* (2013.01); *B32B 2262/0269* (2013.01); *B32B 2262/101* (2013.01); *B32B 2262/106* (2013.01); *B32B 2305/72* (2013.01); *B32B 2307/31* (2013.01); *B32B 2307/736* (2013.01); *B32B 2309/02* (2013.01); *B32B 2309/04* (2013.01); *B32B 2419/00* (2013.01); *B32B 2556/00* (2013.01)

(58) Field of Classification Search
CPC ............ B32B 27/12; B29C 6/02; B29C 73/10
See application file for complete search history.

(56) References Cited

U.S. PATENT DOCUMENTS

2006/0121805 A1* 6/2006 Krulic ..................... B32B 5/022
442/20

FOREIGN PATENT DOCUMENTS

JP 2003117999 A * 4/2003

* cited by examiner

*Primary Examiner* — Victor S Chang
(74) *Attorney, Agent, or Firm* — Marsh Fischmann & Breyfogle LLP; Kent A. Lembke (57) ABSTRACT

A sheet of heat shrink laminated composite for use creating repair patches for repairing or building up a surface formed of a composite material such as fiberglass-reinforced plastic. The sheet includes first and second layers of a heat-curable adhesive. The sheet includes a reinforcement layer sandwiched between the first and second layers of the adhesive. The sheet further includes a pressure application layer, which is formed of a heat-activated shrink wrap film, abutting an outer surface of the first layer of the adhesive. The reinforcement layer may include a sheet of a porous fabric or cloth, which may be fibers of carbon or glass such as unidirectional e-glass fibers. The adhesive is cured when heated to a temperature in a curing temperature range, and the shrink wrap film is activated when heated to a temperature in an activation temperature range that overlaps the curing temperature range of the adhesive.

19 Claims, 6 Drawing Sheets

(51) Int. Cl.
*B32B 27/08* (2006.01)
*B32B 27/12* (2006.01)
*B32B 27/32* (2006.01)
*B32B 27/38* (2006.01)

HEAT SHRINK LAMINATED COMPOSITE PATCH FOR REPAIRING COMPOSITE COMPONENTS

BACKGROUND

1. Field of the Description

The present invention relates, in general, to materials for and methods of repairing damaged surfaces of components (e.g., structural or mechanical elements) that are formed of a composite material or a laminate with such a composite material such as a tube or rod with at least its outer surfaces formed of fiberglass-reinforced plastic (or fiber-reinforced polymer) (FRP), which may also be labeled as glass-fiber reinforced plastic or GRP, or other composite, and, more particularly, to methods of fabricating and applying repair material to a composite component that may include a curved surface in a manner that applies pressure in a uniform and constant manner during curing processes (e.g., during curing of adhesives or resins used to apply a layer or thickness of a composite onto a damaged, curved or planar surface of the composite component or component with an outer layer formed of a composite material such as FRP).

2. Relevant Background

Over the years, there have been many demands for new materials that have particular characteristics that would be useful for a particular application. To this end, material scientists have created many composites or composite materials by combining two or more natural or artificial materials to maximize their useful properties and to minimize their weaknesses. For example, fiberglass-reinforced plastic (FRP) combines fiberglass fibers that are strong but relatively brittle with plastic that is flexible to make a composite material that is tough but not brittle. Often, composites are used in place of metal in part because composites such as FRP are nearly as strong but are much lighter.

In some cases, laminates are formed with layers of composites (and/or other materials) that are permanently bonded together such as with a resin so that the layers behave as one material. These laminates may be thought of as composite laminates or laminated composites. Composite laminates are assemblies of layers of fibrous composite materials that may be joined together to provide desired engineering properties such as in-plane stiffness, strength, and coefficient of thermal expansion. The individual layers of the laminated composite may include high-modulus, high-strength fibers in a polymeric (e.g., FRP), metallic, or ceramic matrix material. Typical fibers that may be provided in a composite include graphite, glass, boron, and silicon carbide, and the matrix material of the composite layer may include an epoxy, a polyimide, or a metal (such as aluminum or alumina).

While the methods for building new structures from composites, including laminated composites, are established and well documented, the repair of structures or components formed of such composites continues to cause engineering challenges. Specifically, repairs of composite structures is not as well documented and proposed practices often have not been field tested or proven. This may be due to the shape of the structures, the field and/or location environment in which "in-place" repairs have to be performed, and the time constraints that may be placed on such field repairs of composite structures including laminated composite structures.

As an example of a particularly challenging repair, there is often a need to repair a surface of a component formed of or with external layers of a composite material such as FRP. The component may be a structural assembly that cannot be readily taken to a shop for repair so that it has to be repaired in place or with a field repair technique. To further add to the difficulty of the repair, it will be understood that very few structural surfaces are flat surfaces, and damaged curved surfaces can be difficult to repair using existing repair techniques and materials. For example, the repair may involve repairing a crack or hole in the curved surface by attempting to apply a layer of a composite material to fill the crack or hole with the newly applied material. The layer of composite material is applied with an adhesive, and, to be effectively bonded to the existing composite material or exposed surfaces, pressure must be uniformly and constantly applied during the curing of the adhesive to create a sound and aesthetically pleasing repair of the damaged surface of the composite component.

Presently, though, there is no way to apply this pressure in a manner that is suited toward "in-place" repairs or making repairs in the field. Traditionally, the pressure has been applied manually by maintenance personnel. However, it is difficult to manually apply a uniform and constant pressure, and a relatively large patch or irregularly shaped or curved component can make this approach impractical. In other cases, a vacuum or autoclave may be used to apply constant pressure during curing, but use of these tools can significantly complicate a field repair or, as in the case of an autoclave, use of such equipment may only be practical for components that can be taken out of the field and back to the shop (e.g., to the autoclave).

Hence, there remains a need for methods and/or materials for repairing composite structures. Preferably, such methods and/or materials would be useful for repairing the composite structures where they are installed or as part of a repair procedure that can be performed in a relatively uncomplicated manner by a maintenance worker with a minimal number of tools (which preferably are readily portable). Further, the new methods and/or materials preferably are useful for repairing curved surfaces of a composite structure and not just planar or flat surfaces.

SUMMARY

Briefly, the inventors recognized that a heat shrink film (or shrink wrap film) could be useful for providing the uniform and constant pressure useful during curing processes. The inventors also recognized that it would be much more convenient and practical for field repairs to have a unitary patch material rather than having to cut and apply each layer of the patch in the field, including the heat shrink film. With these goals and the above-described issues in mind, a heat shrink laminated composite is taught herein that can readily be sized and shaped as a patch and then applied in the field for repairing surfaces of structures and components, including those with curved surfaces.

Briefly, the heat shrink laminated composite is a ply of a fabric reinforcement (such as a glass, Kevlar, carbon, or other fabric) sandwiched between two layers of adhesive (such as an epoxy film adhesive), and the laminate further includes a heat shrink film covering one of the layers of adhesive. The adhesive is chosen to be compatible with the fabric and the substrate to be repaired, and, typically, the adhesive is chosen to be stable at room temperature and to react and/or cure when exposed to heat (e.g., has its temperature raised to a curing temperature within a curing/ reaction temperature range). The heat shrink film and adhesive are also chosen in most cases to react and/or cure at about the same temperature such as by having the two materials reacting within a 20-degree temperature range and/or with the two curing/reaction temperature ranges at least partially overlapping.

To repair a composite component, a damaged surface can be prepped, and a patch can be cut from a sheet of the heat shrink laminated composite. The patch can then be applied to the prepped surface such as by wrapping the patch around a curved surface (e.g., around a tube or rod formed of a composite material such as FRP). Then, heat may be applied to raise the temperature of both the heat shrink film and the adhesive layers to their curing/reaction temperature ranges to cause the adhesive in the adhesive layers to react (e.g., melt) and the heat shrink film to shrink to apply pressure over the entire surface area of the patch as the heat shrink film is the outer surface of the heat shrink laminated composite. The heat is applied for a length of time falling within the curing time of the adhesive and then removed. The fabric of the reinforcement layer is chosen to be porous such that the melted adhesive fully wets and mixes with the reinforcement layer such that the cured product or applied patch is a layer of fabric infused with cured adhesive (e.g., a glass fabric infused with epoxy adhesive or the like), and the adhesive bonds the fabric reinforcement layer to the adjacent composite material of the surface of the component/structure being repaired.

More particularly, a multi-layer sheet is taught herein for use in repairing or building up a surface formed of a composite material (e.g., GRP, FRP, or the like). The sheet may be labeled a heat shrink-laminated composite sheet, and it includes a first layer comprising an adhesive and a second layer comprising the adhesive. Further, the multi-layer sheet includes a reinforcement layer sandwiched between the first and second layers of the adhesive. The multi-layer sheet further includes a pressure application layer comprising a heat-activated shrink wrap film abutting a surface of the first layer of the adhesive opposite the reinforcement layer.

To implement the multi-layer sheet, the reinforcement layer may be provided as a sheet of a porous fabric or cloth, and, to this end, the fabric or cloth may be made up of fibers of glass or carbon. In one particular embodiment, the fibers are glass fibers including unidirectional e-glass fibers. In some cases, the adhesive is cured when heated to a temperature in a curing temperature range defined by a minimum temperature greater than 150° F., and the heat-activated shrink wrap film is activated when heated to a temperature in an activation temperature range that at least partially overlaps the curing temperature range of the adhesive. In some more particular cases, the minimum temperature is greater than about 200° F. and the activation temperature range overlaps the curing temperature range for at least 20 degrees. For example, this may be useful when the adhesive is an epoxy adhesive.

The multi-layer sheet can be formed such that the first and second layers of the adhesive each have a thickness that is at least one half of a thickness of the reinforcement layer. Often, to avoid excess adhesive in a cured product and to provide full wetting of the material of the reinforcement layer, the thickness of the first and second layers of the adhesive is chosen to be equal to one half of the thickness of the reinforcement layer.

DETAILED DESCRIPTION

Briefly, a heat shrink laminated composite is taught herein that can be sized, shaped, and applied in the field to repair or buildup surfaces of a structure or component formed of a composite material such as, but not limited to, fiber glass-reinforced plastic (FRP). The heat shrink laminated composite is made up of a fabric reinforcement layer sandwiched between a pair of adhesive layers formed of a heat activated adhesive material chosen to be compatible with the material of the fabric reinforcement layer. The heat shrink laminated composite further includes a heat shrink film adjacent or covering an exposed surface of one of the adhesive layers (e.g., covering the "outer" adhesive layer which will face outward from the surface being repaired when installed on a composite material structure/component). These material layers are laminated together to provide a unitary or one-piece sheet that can then be cut to fit an area and shape of a surface needing repair. The heat shrink film and the adhesive are chosen to cure/react at a range of common temperature (e.g., to have reaction/curing/activation temperature ranges that at least partially overlap such as with a 20-degree temperature overlap to facilitate field repairs with a heat gun or other heat source).

It is believed that the heat shrink laminated composite provides at least the following advantages and/or benefits: (1) fits all structural shapes and sizes and not just flat surfaces; (2) only requires a small heat source (e.g., a handheld heat gun or the like) to cure and bond to surface of a structure/component being repaired; (3) short application and cure times (e.g., measured in minutes depending on size such as several minutes up 10 to 20 or more minutes); (4) customizable to a particular repair application such as by selecting a shrink pressure provided by the heat shrink film, selecting material properties of the layers of the laminated composite, choosing aesthetics of the cured product/installed repair patch, and sizing the patch to suit a repair need; and (5) there typically are no inconvenient storage requirements as the adhesive used for the adhesive film is generally chosen to be stable at room temperature (e.g., an epoxy adhesive with such room temperature-stable qualities that is cured with heat).

Figure 1:
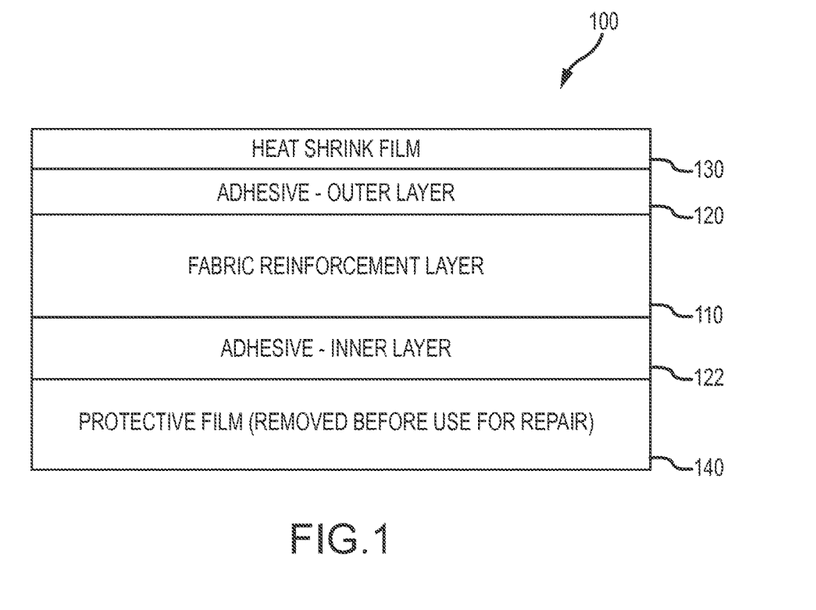
FIG. 1 illustrates a schematic side view of a sheet of a heat shrink laminated composite or repair laminate useful for fabricating composite repair patches of the present description.

FIG. 1 illustrates schematically an end view of a sheet 100 of heat shrink laminated composite that can be used to prepare repair patches or wraps for surfaces of components or structures formed of composites or composite materials (or laminated composites) such as FRP (or GRP or another polymer matrix composite), a metal-matrix composite, a ceramic-matrix composite, or the like. The sheet 100 includes a fabric reinforcement layer 110 that is chosen for its compatibility with the composite of the surface to be repaired. For example, a surface of an FRP component may be repaired with a patch cut from the sheet 100 with the reinforcement layer 110 taking the form of a glass fabric (e.g., unidirectional e-glass fabric, a fiberglass cloth, or the like) while other composite components may be repaired with patches from the sheet 100 with the reinforcement layer 110 taking the form of a Kevlar fabric or cloth, a carbon fabric (or carbon fiber cloth), or fabric of another reinforcing material suitable for the composite material of the surface being repaired.

The sheet 100 also includes a pair of layers 120, 122 of adhesive material (e.g., a film of epoxy adhesive or the like) that is chosen so as to be compatible with the fabric of the reinforcement layer. Particularly, the adhesive material is selected to be stable at room temperature in most applications (but some applications may utilize an adhesive that needs to be refrigerated as it may react at room temperatures). Further, the adhesive material is chosen such that when it is activated or reacts, e.g., at raised temperature falling within a reaction/curing temperature range for the adhesive material, it melts and flows through the gaps and holes/pores of the porous fabric of the reinforcement layer 110. When cured, a new composite layer is formed made up of the cured adhesive (e.g., cured and hardened epoxy when the adhesive is an epoxy adhesive) bonded with the fabric provided by the reinforcement layer 110. As shown, the fabric reinforcement layer 110 is sandwiched between the two (outer and inner) adhesive layers 120, 122 so as to fully wet the reinforcement layer during the adhesive curing process (or to at least wet the outer portions of the fabric of layer 110) and also to effectively bond (e.g., through an adhesion zone) the fabric-adhesive composite to the surface of the component or structure being repaired (not shown in FIG. 1).

To provide a uniform and constant pressure upon the adhesive layers 120, 122 and reinforcement layer 110 once it has been applied to a damaged surface, the sheet 100 includes a heat shrink film 130 covering the outer adhesive layer 120. The heat shrink (or heat-activated shrink wrap) film 130 may take a wide variety of forms to practice the present invention such as a polyolefin shrink wrap while other embodiments may use a shrink film of a polymer plastic such as polyethylene, polypropylene, polyvinyl chloride (PVC), or the like. It may be chosen to provide a desired amount of pressure (amount of shrinkage) when activated. More significantly, though, the heat shrink film 130 may be selected to have an activation temperature that matches or is about the same as the curing temperature of the adhesive of layers 120, 122. To this end, the activation temperature range for the heat shrink film 130 may be chosen to overlap (such as with an overlap of about 15 to 25° F. (or 20° F. overlap in some cases)) so that the film 130 shrinks and applies pressure while the adhesive layers react and/or cure. For example, the adhesive of layers 120, 122 may have a curing temperature range of 250 to 350° F., and the heat shrink film 130 may be chosen to have an activation temperature range that overlaps with this temperature range (e.g., may have an activation temperature range of 200 to 270° F., 280 to 300° F., or the like).

Although not required in all embodiments, the sheet 100 of FIG. 1 is shown to also include a protective film 140 abutting and/or covering the inner adhesive layer 122. The protective film 140 generally may be a thin sheet of plastic or other material that is designed (e.g., with a weak adhesive provided on the side facing the inner adhesive layer 122) to be removed (e.g., peeled off) before use of the sheet 100 to repair a surface of a composite structure or component. The protective film 140 is optional in some cases, but it makes the sheet 100 easier to use and store for later use. For example, the protective film 140 is useful for making the sheet 100 easier to unroll and keeps the inner adhesive layer's outer or exposed surfaces from being contaminated prior to use. The layers of the sheet 100 are laminated together to provide a unitary product or assembly that can later be sized and shaped for application to a surface of a structure or component formed of a composite material that needs to be repaired (e.g., to fill a hole or crack in a curved surface).

This design for a heat shrink laminated composite combines the strength and cleanliness of pre-cured resin with the utility of heat shrink films. The sheet 100 and other embodiments taught herein are laminated products, and each laminated product or sheet includes a film adhesive, dry fiber fabric, and a heat shrink outer casing/layer. The reinforcement layer may be formed with a wide variety of type, construction, and/or direction of fibers making up the fabric or cloth. The film adhesive is selected to be compatible with the fabric or cloth and to have a cure time and temperature similar to the heat shrink film's shrink time (e.g., the film's shrink time should exceed the lower end of the cure time for the film adhesive) and temperature (overlap of ranges as discussed above). The laminated sheet (e.g., sheet 100 of FIG. 1) can be applied to a composite structure and heated until taut and cured, and use of the laminated sheet allows repairs to surfaces of components and structures formed of composites or composite materials to be performed in a short period of time, in the field, and without regard to the shape of the surface (e.g., the surface can take nearly any shape including a curved surface such as about the outside of a cylindrical structure).

Figure 2:
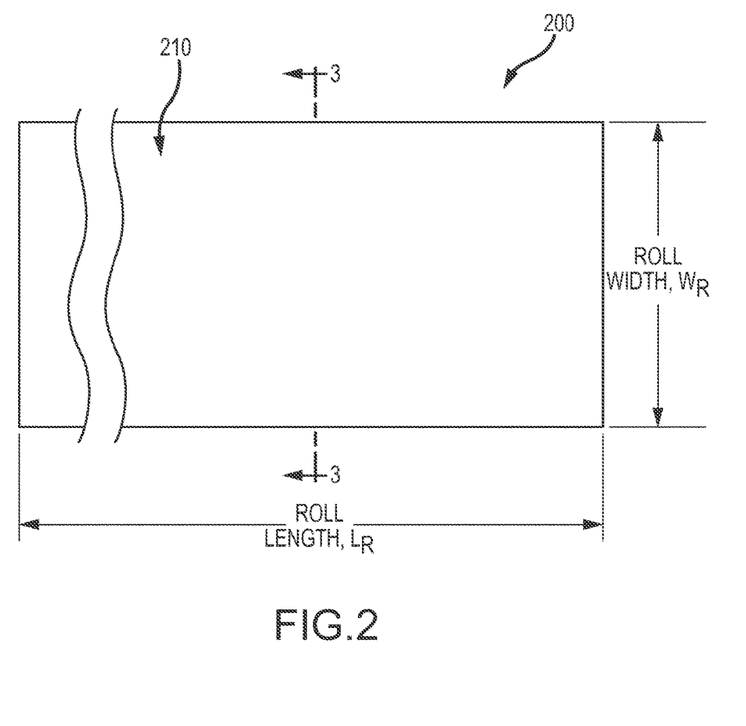
FIG. 2 illustrates a sheet of a heat shrink laminated composite or composite repair laminate.

FIG. 2 illustrates a sheet 200 of a heat shrink laminated composite or composite repair laminate such as may be provided by manufacture of the sheet 100 of FIG. 1. For example, the components or individual layers of material shown in the sheet 100 may be laminated together or be co-extruded to provide a unitary product that can be distributed in rolls of various lengths, Roll Length or $L_R$, and widths, Roll Width or $W_R$, e.g., rolls that are up to 50 to 100 feet or more long with widths of 1 to 3 feet or more to suit particular demands in the maintenance industry (e.g., to meet demands of customers wishing to repair composite material surfaces). In FIG. 2, the exposed layer is a heat shrink film 210, and the sheet 200 may be cut to size and shape it as needed for a particular repair job.

Figure 3:
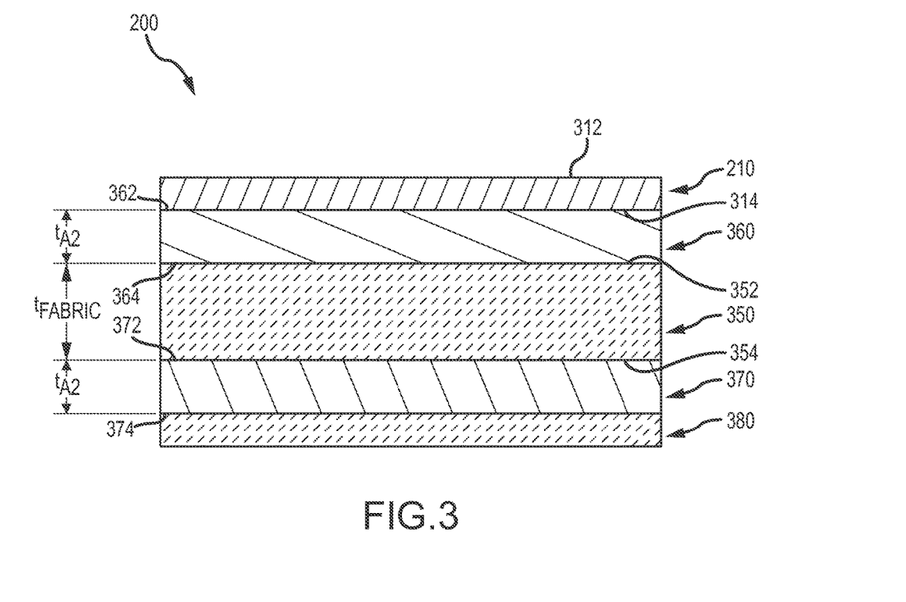
FIG. 3 illustrates a sectional view of the laminated sheet of FIG. 2 taken at line 3-3.

FIG. 3 illustrates a sectional view of the laminated sheet 200 of FIG. 2 taken at line 3-3. As shown, the sheet 200 includes a reinforcement layer 350 with a first or outer surface 352 and an opposite second or inner surface 354. The reinforcement layer 350 is generally planar with a thickness, $t_{Fabric}$, that is chosen based on the available thickness of particular fabric sheets or cloths and also to suit a particular repair operation (e.g., a relatively thick fabric may be used to limit the need for more than one application of repair material to fill or fix a damaged composite surface). As discussed above, the reinforcement layer 350 may take the form of a sheet composed of glass fabric (e.g., cloth with fiberglass fibers or the like), Kevlar fabric, carbon fabric, or the like with one non-limiting example using unidirectional e-glass fabric, and the particular material used for the fibers in the fabric or cloth of layer 350 is often chosen to be compatible in material properties (e.g., strength) with the composite material of the surface to be repaired with the sheet 200.

The sheet 200 also includes first and second layers (or inner and outer layers) 360 and 370 of adhesive (such as an epoxy film or the like). The reinforcement layer 350 is sandwiched between these two adhesive layers 360 and 370 with an inner surface 364 of the outer adhesive layer 360 abutting the outer surface 352 of the adhesive layer 350 and with an outer surface 372 of the inner adhesive layer 370 abutting the inner surface 354 of the adhesive layer 350. The adhesive of layers 360 and 370 typically is the same for both layers 360 and 370 and is chosen to be compatible with the fabric of reinforcement layer 350 and with bonding with material of surfaces to be repaired (e.g., composite material being replaced, filled, or repaired with the sheet 200). Further, the adhesive material is chosen to provide desired material properties such as strength and resistance to wear that may match the repaired composite surfaces. For example, an epoxy film may be used for the layers 360, 370 when the reinforcement layer 350 includes a glass fabric such as a unidirectional e-glass fabric or fiberglass cloth.

Further, the thicknesses, $t_{A1}$ and $t_{A2}$, of the two adhesive layers 360, 370 typically are equal to each other and, more significantly, are chosen to wet a particular depth of the fabric in layer 350. For example, the fabric of reinforcement layer 350 may be chosen to be porous to facilitate movement of melted material from layers 360, 370 (during curing processes), and it may be desirable for the adhesive to fully wet and mix with (or infuse into) the fibers of the fabric in layer 350. To this end, the adhesive layers 360, 370 may each have a thickness, $t_{A1}$ and $t_{A2}$, that is at least one half of that of the thickness, $t_{Fabric}$, to fully wet the layer 350. In some cases, the thicknesses may be exactly one half (plus or minus some tolerance) to avoid having excess adhesive material in the cured product (or applied composite patch). In other cases, a less than full wetting may be acceptable and the thicknesses, $t_{A1}$ and $t_{A2}$ may be some amount less than one half of the thickness, $t_{Fabric}$, of layer 350 (e.g., each in the range of 40 to 50 percent of the thickness, $t_{Fabric}$).

As shown in the off-the-shelf (or pre-application) sheet 200, a heat-activated shrink film 210 is provided over the outer adhesive layer 360. Specifically, the shrink film 210 has an inner surface 314 that contacts and mates with the outer surface 362 of the outer adhesive layer 360, and the film 210 also has an outer surface 312 facing away from the reinforcement fabric 350 as well as surfaces of a composite structure or component to which sheet 200 is later applied. The shrink film 210 is activated by application of heat to raise its temperature into an activation temperature range, and this causes the film 210 to attempt to shrink in size (e.g., shrink the outer diameter of a patch formed from sheet 200 when wrapped about the circumference of a composite rod or tube), which applies a uniform and constant pressure upon the lower layers of 360, 350, 370 and surface being repaired (not shown in FIG. 3). As discussed above, the specific material used for the shrink wrap 210 may vary, but it is typically useful for the activation temperature range and time for the wrap 210 to match or at least overlap with the curing temperature and time of the adhesive used in layers 360, 370 (e.g., a twenty degree overlap and an activation time falling within curing time range for the adhesive).

The sheet 200 further includes a protective film 380 applied over the inner (or repair surface-matching) surface 374 of the inner adhesive layer 370. The film 380 is chosen to protect the surface 374 from becoming contaminated or dirty as well as allowing the sheet 200 to easily be rolled upon itself for delivery/storage but to allow it to be easily unrolled with sticking to other surfaces. The protective film 380 typically will include a relative weak adhesive layer (not shown) that mates with and temporarily attaches the film 380 to the surface 374 of the adhesive layer 370. In this way, the protective film 380 can easily be removed from the sheet 200 or a composite repair patch formed by cutting the sheet 200 into a desired size and shape immediately prior to its application to a surface of a composite structure or component (e.g., an FRP rod or the like), e.g., removed in the field in most cases.

Figure 4:
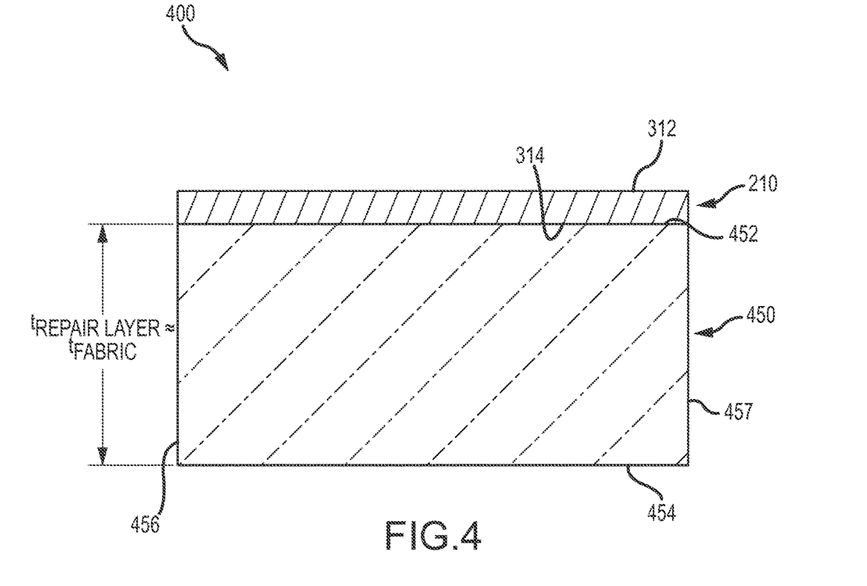
FIG. 4 illustrates a sectional view, similar to that of FIG. 3, after heating is used or applied to the sheet of the heat shrink laminated composite (e.g., when the material is used as a patch for a surface of a composite structure or component) so as to form a cured product (or installed/applied patch)

FIG. 4 illustrates a sectional view, similar to that of FIG. 3, after heating is used or applied to the sheet 200 of the heat shrink laminated composite so as to form a cured product or applied/installed patch 400. Prior to heating, the protective layer 380 shown in FIG. 3 on sheet 200 has been removed so that the inner adhesive layer 370 is exposed and surface 374 can be pressed against a composite surface (not shown) that is being repaired. For example, the cured product 400 shows the state of the sheet 200 (or a section that has been cut from sheet 200 to form a patch) after heat has been applied, such as with a heat gun, to activate the heat shrink 210 and to also react/cure the two adhesive layers 360 and 370 shown in FIG. 3.

Particularly, the application of heat is used to raise the temperature of the sheet 200 to a temperature that is both in the activation temperature range of the heat shrink 210 and also in the reaction/cure temperature range of the adhesive provided in the two adhesive layers 360 and 370. Further, the application of heat is continued for a time period that falls within a curing time range for the adhesive of layers 360, 370 (and also suits the shrink time of the heat-activated shrink film 210). As shown in FIG. 4, the resulting cured product (or applied patch) 400 no longer has distinct and separate reinforcement layer 350 and adhesive layers 360, 370.

Instead, a new layer 450 is formed that is the fabric infused with cured adhesive (e.g., a fabric of glass fiber or other fibers infused with epoxy or the like). This new layer is formed under constant pressure as the shrink film 210 shrinks in size causing its inner or inward facing surface 314 to apply pressure or compression forces against an outer surface 452 of layer 450 (which during initial curing processes is outer surface 362 of the outer adhesive layer 360). The adhesive material of layers 360, 370 melts and flows through the pores of the porous material of the fabric reinforcement layer 350 as the new composite layer 450 is formed, and, as the adhesive cures, the two materials integrally bond together to form a new composite material.

Additionally, the adhesive material of the two layers 360, 370 acts to bond the material of new layer 450 to adjacent surfaces, such as surfaces of a structure/component formed of a composite material compatible with the fabric and adhesive materials of layers 350, 360, and 370. Hence, the inner surface 454 of layer 450 bonds (in an adhesion zone) the patch/cured product 400 to the surface being repaired (now a "repaired surface") as do sides/edges 456, 457 when the patch/sheet 400 is applied to a recessed surface (rather than simply on top of a surface to be repaired as may be useful in some repair/maintenance applications).

The new composite layer 450 (or "repair layer") has a thickness, $t_{Repair\ Layer}$, as measured between the outer and inner surfaces 452, 454. This thickness, $t_{Repair\ Layer}$, may be greater than the thickness, $t_{Fabric}$, of the original fabric reinforcement layer 350, but, in some preferred embodiments where additional adhesive is not desired, the new layer 450 has a thickness, $t_{Repair\ Layer}$, that is equal to the thickness, $t_{Fabric}$, of the original fabric reinforcement layer 350 (or some relatively small amount less due to compression by the shrink wrap film 210) as may be the case when the two adhesive layers 360, 370 are provided at about 50 percent the thickness, $t_{Fabric}$, of the reinforcement layer 350. After the curing process for the adhesive materials is complete, the heat shrink film 210 may be left on the patch 400 such as when it has been decorated or themed to fit the repaired surface and surrounding environment or the film 210 may be removed (and the surface 452 of the new composite or repair layer 450 may be themed or decorated to suit the repaired surface, structure, or surrounding environment).

Figure 5:
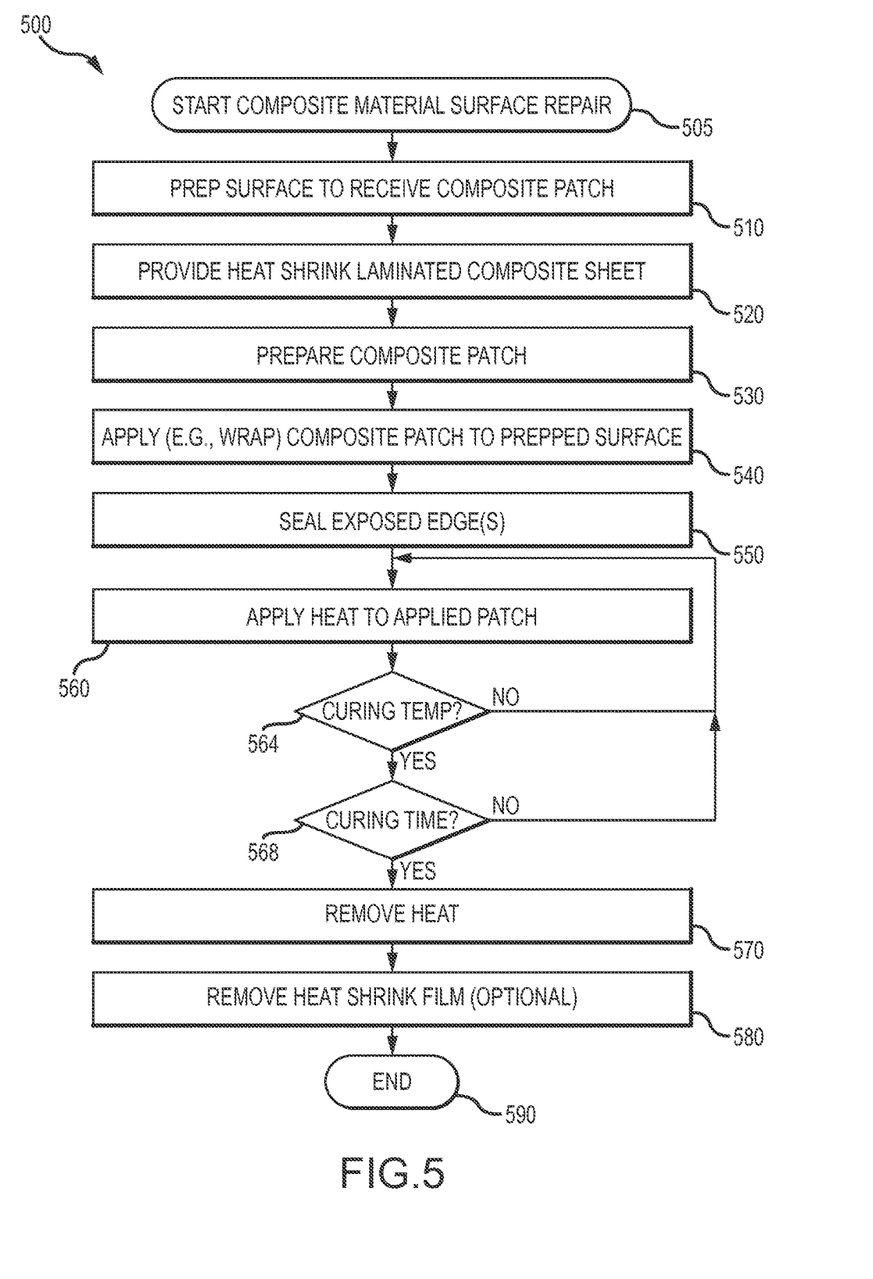
FIG. 5 is a flow diagram for a method of repairing a surface of a component/structure formed of a composite material using a repair patch formed from a sheet of heat shrink laminated composite such as those described in FIGS. 1-4.

FIG. 5 is a flow diagram for a method 500 of repairing a surface of a component/structure formed of a composite material using a repair patch formed from a sheet of heat shrink laminated composite such as those described in FIGS. 1-4. The method 500 begins at 505 as such with identifying a damaged (e.g., chipped, cracked, or the like) surface on a component or structure formed (at least with its outer/exposed surfaces) of a composite material (or laminate of composite materials). The composite material may take on a wide variety of forms as discussed throughout this description with a composite such as a glass or fiberglass-reinforced plastic (GRP or FRP) being widely used throughout the construction and building industries.

The method 500 then continues at 510 with preparing the damaged surface (i.e., the surface identified as needing repair in step 505) to receive a repair or composite patch (e.g., a wrap sized and cut from one of the sheets of heat shrink laminated composite taught herein). Preparation is generally performed to facilitate good bonding of the new material from the patch with the existing materials and to remove damaged portions of the composite material of the surface to be repaired. For example, an FRP rod may need repair at or near a joint, and prepping in step 210 may involve sanding the damaged surface (e.g., to remove damaged material and create a recessed surface for receiving the patch (e.g., to a depth of about the expected final thickness of the cured product/applied composite patch)). Once sanding is complete, prepping 510 may also include cleaning the surface to be repaired such as by wiping the FRP rod's surface at and around the joint with a solvent (suited to the particular composite material forming the surface).

The method 500 continues at 520 with providing a sheet of heat shrink laminated composite that is chosen to be compatible with the composite material of the surface to be repaired. For example, the surface that is damaged may be formed of FRP or other composite, and the sheet provided in step 520 is chosen to provide a reinforcement material such as one with a glass fabric (e.g., a unidirectional e-glass fabric or the like) as well as to provide adhesive materials in its two adhesive films that are suited for bonding with FRP (such as an epoxy adhesive (i.e., the two adhesive layers may be formed using films of epoxy adhesive)). Typically, the adhesive is chosen so as to be stable at room temperature, but some embodiments may use adhesive that requires refrigeration to remain stable until used for a repair.

The inventors believe that with the teaching provided herein that in the near future maintenance sheets of composite for the patch may be available in rolls of laminate with the layers of material discussed in FIG. 1-4. If not, the patch sheet may be fabricated as needed by cutting equally sized sections of a heat-activated shrink film (e.g., a polyolefin shrink wrap or the like), a reinforcement fabric (e.g., unidirectional e-glass fabric or the like), and adhesive film (e.g., two sections of epoxy film adhesive or the like). Then, these four sections can be assembled as shown in FIGS. 1 and 3 (with or without a protective film in this case) and laminated (or otherwise joined) together.

In step 530, the sheet provided in step 520 is cut, if and as needed, to form a repair patch that has the size and shape desired to repair the surface prepped in step 510. In the present working example, the surface to be repaired is an exterior surface of a rod (or joint in a rod). In this case, step 520 may involve cutting a square or rectangular section of the sheet from step 520 that has a width that is the same or some amount larger than the prepared surface of step 510 and with a length that allows the patch to be wrapped fully (or more than fully) about the rod (e.g., a length equal to or greater than the circumference of the rod being repaired).

The method 500 continues at step 540 with applying or attaching the repair patch from step 530 to the prepped surface of the component/structure. In the rod example, this step may involve wrapping the laminate sized to the surface to be repaired tightly around the FRP (or other composite material) rod so as to cover or fill the surface being repaired. The method 500 may continue (optionally in some cases) with sealing at 550 exposed edges of the repair patch so as to better retain the patch over the surface being repaired during the later curing/activation steps, and step 550 may involve using a low-temperature soldering gun (or a soldering gun on a low setting) or other heat source to heat and seal the edges which may be at the sides of the patch or where the patch has been wrapped over upon itself (e.g., if the patch has a length exceeding that of the circumference of the rod or curved surface).

The method 500 then continues at 560 with applying heat to the patch applied in step 540 so as to activate and/or cure the adhesive material in the two adhesive layers and to activate the shrink wrap to apply uniform and constant pressure to the inner layers of the patch. The activating of the shrink wrap is used to apply force over the entire surface area of the outer adhesive layer during the curing of the adhesive so as to better infuse the fabric of the reinforcement layer and to assist in bonding of the newly formed composite or repair layer with the composite material of the surface being repaired. Step 560 may be performed using a variety of heat sources such as a portable heat gun for a period of time falling within both the activation time period for the shrink wrap and the curing time period for the adhesive (e.g., 1 to 10 minutes or more in some cases).

At step 564, the method 500 may involve determining whether or not the curing temperature for the adhesive has been reached (and the activation temperature for the shrink wrap as this material is chosen to have an activation temperature range overlapping that of the adhesive material's curing temperature range). The heat gun may be selected to provide heat that can raise a patch's temperature to some predefined minimum temperature falling in the curing temperature range. For example, the adhesive may be an epoxy adhesive and the shrink wrap may be a polyolefin shrink wrap, and, in this non-limiting example, a heat gun can be used to apply heat relatively uniformly at a minimum temperature of about 200° F. If not a high enough temperature (or not enough heat from source), the method 500 continues at 560. If heat is provided to raise the patch material temperature over the curing temperature, the method 500 continues at 568 with determining if the heat has been applied for more than the minimum curing time (e.g., for a length of time falling within a curing temperature range of the adhesive in the adhesive layers of the repair patch). If not, steps 560, 564, and 568 are repeated until the minimum curing time is met or exceeded. The curing time will vary with the particular adhesive, but many epoxy adhesives have a curing time that is quite short such as a range of 1.5 to 5 minutes or the like.

Once the curing time is satisfied, the method 500 continues at 570 with ending the application of heat with the heat source (e.g., by moving the heat gun away from the repair patch or turning the heat gun off). At this point, the adhesive material has melted and fully wetted (or wetted to a desired or designed amount) the fabric of the reinforcement layer to form a new composite layer (or repair layer), and this layer has been bonded to the surface being repaired (e.g., a cured product, which is permanently attached to or over the repaired surface, has been created through performance of steps 550-568). The method 500 may then continue at step 580 with removing the heat shrink film to expose the newly installed/applied composite layer provided by the repair patch. This is an optional step as it may be useful or acceptable to leave the shrink wrap over the repaired surface of the structure/component. The method 500 then can end at step 590 or be repeated beginning at step 510 to repair another composite material surface.

Figure 6A:
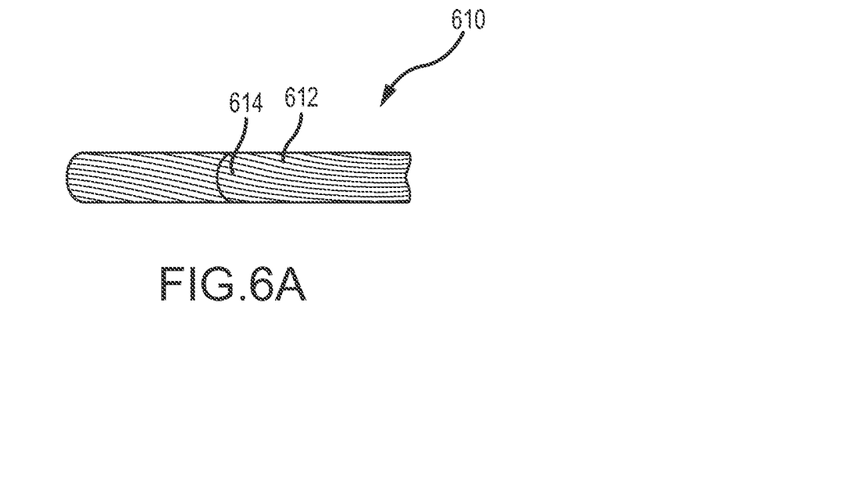
FIGS. 6A-6C illustrate exemplary implementation of a number of the steps of the method of FIG. 5 illustrating repair of a composite material rod with a repair patch formed from a sheet of heat shrink laminated composite.
Figure 6B:
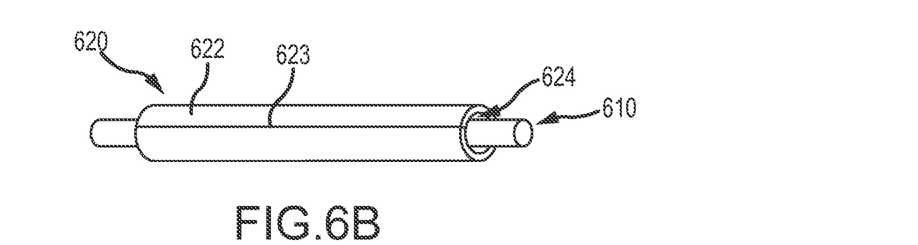
Figure 6C:
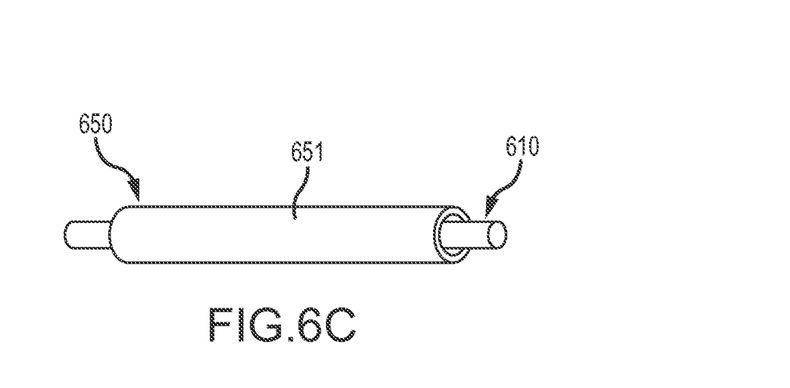

FIGS. 6A to 6C illustrate portions of an exemplary implementation of the method 500 of FIG. 5 showing repair of a composite rod (e.g., a component or structure with a curved surface). FIG. 6A corresponds with step 510 of method 500 showing a rod (e.g., an FRP or other composite material rod) 610 that has a curved surface 612 (e.g., a cylindrically shaped exterior surface) that is to be repaired such as to fill in the recessed surface, gap, or joint (e.g., between two sections used to form rod 610) 614 in the surface 612. The surface 612 may be prepped for receiving a heat shrink laminated composite patch by sanding the surface 612 near or to form the recessed surface 614 and then wiping it down with a solvent.

FIG. 6B corresponds with steps 530 and 540 of method 500. Particularly, a repair patch has been cut (sized and shaped) from a sheet of heat shrink laminated composite suited for the material of the rod 610 (or its surface 612). Then, the repair patch 620 has been tightly wrapped around the FRP rod 610 so as to cover the surface 612 being repaired on the rod 610. The repair patch 620 has an outer layer 622 in the form of a heat-activated shrink wrap and inner layers 624 such as a fabric reinforcement layer sandwiched between two adhesive layers, and the inner adhesive layer is placed in contact with the surface 612 (against recess 614) on the rod 610 and the outer adhesive layer is abutting the shrink wrap layer 622. The length of the patch 620 is greater than the circumference of the rod at surface 612 such that the patch 620 wraps over upon itself and a seam 623 is formed, and this seal 623 and ends/edges of the patch 620 may be sealed as discussed with regard to performance of step 550 of the method 500.

FIG. 6C corresponds with completion of steps 560 through 580 of the method 500 of FIG. 5. Particularly, the wrapped patch 620 has been heated with a heat gun or other heat source to raise its temperature to be within a curing temperature range for adhesive in layers 624 for a length of time exceeding a minimum curing time period. This also results in the shrink wrap layer 620 being heated to its activation temperature (a temperature within an activation temperature range for a polyolefin shrink wrap such as a temperature above 200° F. or the like). As shown in FIG. 6C, the shrink wrap layer 620 shown in FIG. 6B has been removed to show the repaired rod 610.

Due to the application of heat for a curing period (e.g., performance of steps 560 to 570 in method 500) on the assembly of FIG. 6B, a cured product or repair layer 650 has been formed and bonded to the repaired surface 612 of the rod 610. The exposed or outer surface 651 of the cured product 650 is a composite material and not simply made up of the adhesive (or the removed shrink wrap layer 622). Instead, the composite material found in surface 651 is a fabric infused with cured adhesive such as an epoxy. The cured product 650 may be sanded to provide a smooth surface with adjacent portions of the rod 610 and/or themed/decorated to match the rod 610. The cured product 650 is bonded to the rod 610 such the cured product 650 is substantially an integral and permanent portion of the rod 610.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

In proving their concepts and designs, the inventors fabricated a prototype sheet (e.g., like sheet 100 of FIG. 1) by combining the individual components (fabric sheet, film adhesive, and shrink wrap film) together. The prototype sheet was applied to a fiberglass rod joint using a heat gun (e.g., a heat gun with a 400° F. maximum temperature), and the cured or applied repair patch had material properties similar to those of the nearby surfaces of the fiberglass rod and appeared to have a strong and/or permanent bond to the abutting surfaces of the fiberglass rod joint. In practice, though, it is more likely that sheets of the composite repair material would be formed by combining the layers/films of material, such as by laminating and/or co-extrusion, into a single or unitary product (a laminate) that could then be cut to length and shape for use as needed to repair damaged composite surfaces.

The shrink wrap or heat-activated shrink film may be themed or decorated to suit the application and surrounding environment such as via printing during manufacturing of the repair sheet or laminate or, in other cases, this outer pressure-providing layer may be removed after cure of the adhesive layers so as to expose an outer surface of the applied repair patch (e.g., the fabric that is now infused with the adhesive), which can be themed or decorated to suit the application or surrounding environment.

We claim:

1. A multi-layer sheet for use in repairing and building up a surface formed of a composite material, comprising:
   a first layer comprising a resin;
   a second layer comprising the resin, wherein the resin comprises a heat activated adhesive;
   a reinforcement layer sandwiched between the first and second layers of the resin; and
   a pressure application layer comprising a heat-activated shrink wrap film abutting a surface of the first layer of the resin opposite the reinforcement layer, wherein the adhesive is cured when heated to temperatures in a curing temperature range and wherein the heat-activated shrink wrap film has an activation temperature range at least partially overlapping the curing temperature range of the adhesive.

2. The multi-layer sheet of claim 1, wherein the reinforcement layer comprises a sheet of a porous fabric or cloth.

3. The multi-layer sheet of claim 2, wherein the fabric or cloth comprises fibers of glass or carbon.

4. The multi-layer sheet of claim 3, wherein the fibers are glass fibers including unidirectional e-glass fibers.

5. The multi-layer sheet of claim 2, wherein the curing temperature range has a minimum temperature greater than 150° F.

6. The multi-layer sheet of claim 5, wherein the adhesive comprises an epoxy adhesive.

7. The multi-layer sheet of claim 5, wherein the minimum temperature is greater than about 200° F. and wherein the activation temperature range overlaps the curing temperature range for at least 20 degrees.

8. The multi-layer sheet of claim 5, wherein the adhesive has a curing time period and wherein the heat-activated shrink wrap film has a shrink time that is in the curing time period.

9. The multi-layer sheet of claim 1, wherein the first and second layers of the resin each has a thickness that is at least one half of a thickness of the reinforcement layer.

10. The multi-layer sheet of claim 1, wherein the thicknesses of the first and second layers of the resin are both equal to one half of the thickness of the reinforcement layer.

11. The multi-layer sheet of claim 1, wherein the heat-activated shrink wrap film comprises a polyolefin shrink wrap film.

12. A laminate for field repair of damaged surfaces, comprising:
   first and second films of an adhesive reacting when heated to a temperature in a first temperature range;
   a porous fabric layer between the first and second films of heat activated adhesive; and
   a heat shrink film,
   wherein the first film of the heat activated adhesive is sandwiched between the heat shrink film and the porous fabric layer,
   wherein the heat shrink film is activated to shrink and apply pressure on the first film of the heat activated adhesive when heated to a temperature in a second temperature range that overlaps with the first temperature range, and
   wherein the first and second films, the porous fabric layer, and the heat shrink film are laminated into a unitary sheet.

13. The laminate of claim 12, wherein, when the adhesive is heated to the temperature in the first temperature range for a curing time period, the first and second films infuse the porous fabric layer to form a layer of composite material.

14. The laminate of claim 13, wherein the porous fabric layer comprises a fabric including glass, carbon, or Kevlar fibers.

15. The laminate of claim 13, wherein the adhesive comprises an epoxy film and wherein the first and second films each have a thickness of at least about 50 percent of a thickness of the porous fabric layer.

16. A multi-layer sheet for use in repairing and building up a surface formed of a composite material, comprising:
   a first layer comprising a resin;
   a second layer comprising the resin, wherein the resin comprises an adhesive;
   a reinforcement layer, comprising a fabric sheet, sandwiched between the first and second layers of the resin; and
   a pressure application layer comprising a heat-activated shrink wrap film abutting a surface of the first layer of the resin opposite the reinforcement layer,
   wherein the adhesive is cured with temperatures in a curing temperature range having a minimum temperature greater than 150° F. and wherein the first and second layers of the resin have a thickness that is at least one half of a thickness of the reinforcement layer.

17. The multi-layer sheet of claim 16, wherein the heat-activated shrink wrap film has an activation temperature range at least partially overlapping the curing temperature range of the adhesive.

18. The multi-layer sheet of claim 16, wherein the fabric sheet comprises fibers of glass or carbon.

19. The multi-layer sheet of claim 16, wherein the minimum temperature is greater than about 200° F., wherein the activation temperature range overlaps the curing temperature range for at least 20 degrees, and wherein the adhesive has a curing time period and wherein the heat-activated shrink wrap film has a shrink time that is in the curing time period.

* * * * *